United States Patent
Kim et al.

(10) Patent No.: US 12,211,654 B2
(45) Date of Patent: Jan. 28, 2025

(54) ENERGY STORAGE FILM AND METHOD OF MANUFACTURING SAME

(71) Applicant: Korea National University of Transportation Industry-Academic Cooperation Foundation, Chungcheongbuk-do (KR)

(72) Inventors: Sung Ryong Kim, Gyeonggi-do (KR); Minh Canh Vu, Chicago, IL (US)

(73) Assignee: Korea National University of Transportation Industry-Academic Cooperation Foundation, Chungcheongbuk-do (KR)

( * ) Notice: Subject to any disclaimer, the term of this patent is extended or adjusted under 35 U.S.C. 154(b) by 0 days.

(21) Appl. No.: 18/048,712

(22) Filed: Oct. 21, 2022

(65) Prior Publication Data

US 2023/0127153 A1 Apr. 27, 2023

(30) Foreign Application Priority Data

Oct. 27, 2021 (KR) .................. 10-2021-0144869

(51) Int. Cl.
*H01G 4/33* (2006.01)
*H01G 4/012* (2006.01)
*H01G 4/08* (2006.01)

(52) U.S. Cl.
CPC .............. *H01G 4/33* (2013.01); *H01G 4/012* (2013.01); *H01G 4/08* (2013.01)

(58) Field of Classification Search
None
See application file for complete search history.

(56) References Cited

U.S. PATENT DOCUMENTS

| | | | |
|---|---|---|---|
| 2017/0081194 A1* | 3/2017 | Zhamu | C01B 32/194 |
| 2017/0283565 A1* | 10/2017 | Ono | H01G 9/02 |
| 2019/0312311 A1* | 10/2019 | He | H01M 4/38 |
| 2020/0243844 A1* | 7/2020 | Jang | H01M 4/583 |
| 2022/0041912 A1* | 2/2022 | Kim | C01B 32/198 |
| 2023/0127153 A1* | 4/2023 | Kim | H01G 4/33 |
| | | | 361/304 |

FOREIGN PATENT DOCUMENTS

WO WO-2016047764 A1 * 3/2016 ............. B32B 29/00

OTHER PUBLICATIONS

Office Action, App. No. KR10-2021-0144869, Mailed Nov. 9, 2022, 4 pages.
Ahmad, et al, "Preparation and Applications of Fluorinated Graphenes," C 2021, 7, 20. https://doi.org/10.3390/c7010020, https://www.mdpi.com/journal/carbon, Published Feb. 7, 2021, 23 pages.

(Continued)

*Primary Examiner* — Dion R. Ferguson
(74) *Attorney, Agent, or Firm* — Berkeley Law & Technology Group, LLP

(57) ABSTRACT

Disclosed are a high-temperature capacitive energy storage film having a structure in which graphene fluoride (GF) is sandwiched between aramid nanofibers (ANFs) and a method of manufacturing the same.

9 Claims, 15 Drawing Sheets
(6 of 15 Drawing Sheet(s) Filed in Color)

(56) References Cited

OTHER PUBLICATIONS

Kwon, et al, "Robust and Flexible Aramid Nanofiber/Graphene Layer-by-Layer Electrodes," DOI: 10.1021/acsami.7b03449 ACS Appl. Mater. Interfaces 2017. 9, pp. 17125-17135.

Vu, et al, "Scalable ultrarobust thermoconductive nonflammable bioinspired papers of graphene nanoplatelet crosslinked aramid nanofibers for thermal management and electromagnetic shielding," This journal is © The Royal Society of Chemistry 2021, J. Mater. Chem. A, 2021, 9, pp. 8527-8540.

* cited by examiner

ENERGY STORAGE FILM AND METHOD OF MANUFACTURING SAME

Priority is claimed on Korea Patent Application No. 10-2021-0144869, filed in Korea on Oct. 27, 2021, the content of which is incorporated herein by reference.

BACKGROUND OF THE INVENTION

Field of the Invention

The present invention relates to an energy storage film and a method of manufacturing the same, and more particularly to a high-temperature capacitive energy storage film having a structure in which graphene fluoride (GF) is sandwiched between aramid nanofibers (ANFs), and a method of manufacturing the same.

Description of the Related Art

With the rapid spread of portable electronic devices, light and flexible energy storage devices having high energy density, high power density, and fast charge/discharge cycles are essential in many technological fields, such as those of wearable electronic devices, next-generation microelectronics, electric vehicles, and aerospace systems. A capacitor is one of the components used for advanced integrated electronic and power systems. Dielectric (electrostatic) capacitors are capable of storing electrical energy and being rapidly charged/discharged by applying/removing an external electric field due to the high power density and low energy loss thereof.

Both high dielectric constant ($\varepsilon_r$) and breakdown strength ($E_b$) are required to achieve high energy storage density, and polymers, characterized by excellent mechanical flexibility, high breakdown strength, easy processability, scalability, and low cost, are being increasingly used as dielectric materials. However, most polymers have low energy storage density due to the relatively low dielectric constant ($\varepsilon_r$) (less than 10) and low electric polarizability thereof. In order to increase the $\varepsilon_r$ of the polymer material, a ceramic or electrically conductive nanomaterial having high $\varepsilon_r$ has been used as a filler in the polymer matrix. However, the use of the filler deteriorates the important characteristic of low dielectric loss.

In addition, the currently useful dielectric polymer nanocomposite has a relatively low operating temperature (usually less than 200° C.), so there is a problem in that practical application thereof is difficult. In particular, a complex heat dissipation system must be introduced due to a problem of heat generation under strong electric fields at high temperatures, which complicates the design and affects the fuel efficiency of automobiles.

Ceramic fillers such as aluminum oxide ($Al_2O_3$), titanium oxide ($TiO_2$), and boron nitride nanosheets (BNNS) have been introduced in order to improve the thermal stability of dielectric polymers, but they cause problems such as complication of manufacturing processes, increased costs, and reduced flexibility.

SUMMARY OF THE INVENTION

The present invention has been made keeping in mind the problems encountered in the related art, and is intended to provide an energy storage film having high-temperature capacitive energy storage properties (high energy density and charge/discharge efficiency), low cost, and high mass-production capability, and a method of manufacturing the same.

An embodiment of the present invention provides an energy storage film, including a first layer and a second layer including aramid nanofibers (ANFs) and a mid-first layer including graphene fluoride (GF) disposed between the first layer and the second layer.

In the energy storage film according to an embodiment of the present invention, the aramid nanofibers may be cross-linked with a crosslinking agent.

In the energy storage film according to an embodiment of the present invention, the graphene fluoride may be exfoliated from graphite fluoride and may have a lateral size of 0.1 μm to 10 μm.

In the energy storage film according to an embodiment of the present invention, the mid-first layer may be formed from a GF suspension including graphene fluoride at a concentration of 0.1 mg·mL$^{-1}$ to 30 mg·mL$^{-1}$.

In the energy storage film according to an embodiment of the present invention, the diameter of the aramid nanofibers may be 5 to 50 nm.

The energy storage film according to an embodiment of the present invention may further include a third layer including aramid nanofibers and a mid-second layer including graphene fluoride disposed between the second layer and the third layer.

Another embodiment of the present invention provides a method of manufacturing an energy storage film, including preparing a graphene fluoride suspension including graphene fluoride, preparing an aramid nanofiber suspension, applying the graphene fluoride suspension on an aramid nanofiber film made of the aramid nanofiber suspension, and casting the aramid nanofiber suspension on the graphene fluoride, followed by drying.

Here, the graphene fluoride may be exfoliated from graphite fluoride.

Exfoliation of the graphite fluoride may be performed using at least one of a shear-induced fluidic reactor, tip sonication, and ball milling.

The aramid nanofiber suspension may include aramid nanofibers crosslinked with a crosslinking agent.

The graphene fluoride suspension may include graphene fluoride at a concentration of 0.1 mg·mL$^{-1}$ to 30 mg·mL$^{-1}$.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects, features, and other advantages of the present invention will be more clearly understood from the following detailed description taken in conjunction with the accompanying drawings, in which.

DETAILED DESCRIPTION OF THE INVENTION

Figure 1A:
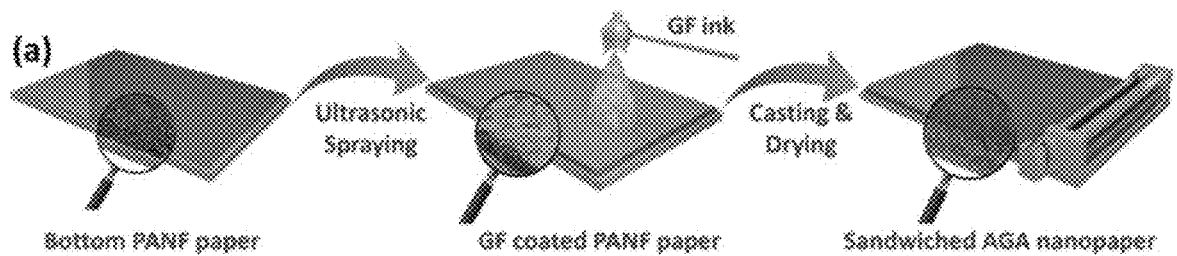
FIG. 1A schematically shows a process of manufacturing an energy storage film of the present invention.

Hereinafter, various embodiments of the present document will be described with reference to the accompanying drawings. The embodiments and terms used herein are not intended to limit the technology described in this document to specific exemplary embodiments, but it should be understood to cover various modifications, equivalents, and/or substitutions of the embodiments.

With reference to the accompanying drawings, a detailed description will be given of embodiments of the present invention below.

An energy storage film according to various embodiments of the present invention has a structure in which graphene fluoride (GF) is sandwiched between aramid nanofibers (ANFs). Specifically, the energy storage film of the present invention includes a first layer and a second layer including aramid nanofibers, and a mid-first layer including graphene fluoride, which is disposed between the first layer and the second layer.

Here, the aramid nanofibers may be crosslinked with a crosslinking agent. For example, aramid nanofibers may be crosslinked with any crosslinking agent such as hexachlorophosphazene (phosphonitrilic chloride trimer, PNCT), borate, polyethyleneimine, or phenylenediamine. Preferably, the aramid nanofibers are crosslinked with PNCT. Thereby, the thermal stability of aramid nanofibers may be improved, and the energy storage film may be capable of operation up to 500° C.

The aramid nanofibers may have a maximum length of 10 μm and a diameter of 5 to 50 nm. The aramid nanofibers may exist in an intertwined form.

The graphene fluoride included in the mid-first layer may be exfoliated from graphite fluoride. The average size of graphene fluoride may be 1.3±0.4 μm, and the lateral size thereof may be 0.1 to 10 μm. Most graphene fluoride may have a lateral size of 0.5 to 2 μm.

Here, the mid-first layer may be formed from a GF suspension including graphene fluoride at a concentration of 0.1 mg·mL$^{-1}$ to 30 mg·mL$^{-1}$. Thereby, dielectric loss may be effectively suppressed, which is advantageous in realizing low leakage current and low energy loss.

Also, the energy storage film of the present invention may further include a third layer including aramid nanofibers and a mid-second layer including graphene fluoride between the second layer and the third layer. Specifically, the energy storage film may have a sandwich structure including a first layer, a mid-first layer, a second layer, a mid-second layer, and a third layer. However, the embodiments of the present invention are not limited thereto, and various numbers of mid-layers may be disposed between the aramid nanofiber films to form a variety of layered structures.

The energy storage film according to various embodiments of the present invention has a sandwich structure, and thus exhibits excellent high-temperature capacitive energy storage capability. Specifically, the energy storage film of the present invention is capable of effectively reducing leakage current density, thus realizing large displacement, high energy density, and high charge/discharge efficiency and maintaining superior breakdown strength even at high temperatures.

The energy storage film of the present invention has excellent flexibility and is thus applicable to a flexible electronic device.

The energy storage film of the present invention is applicable to various fields requiring ability to withstand severe operating temperatures, such as those of wearable electronic devices, next-generation microelectronics, electric vehicles, and aerospace systems.

Below is a description of a method of manufacturing the energy storage film according to the present invention.

With reference to FIG. 1A, a method of manufacturing an energy storage film according to various embodiments of the present invention may include preparing a suspension including graphene fluoride, preparing an aramid nanofiber suspension, applying the graphene fluoride suspension on an aramid nanofiber film made of the aramid nanofiber suspension, and casting the aramid nanofiber suspension on the graphene fluoride, followed by drying.

In the step of preparing the suspension including graphene fluoride (hereinafter referred to as 'GF'), GF exfoliated from graphite fluoride may be prepared. The process for exfoliation of graphite fluoride may be performed using at least one of a shear-induced fluidic reactor, tip sonication, and ball milling. For example, graphite fluoride dispersed in N-methyl-2-pyrrolidone (5 mg·mL$^{-1}$) may be placed in a reactor, followed by exfoliation at 2000 rpm for 1 hour. Thereafter, mono- and/or few-layered GF may be separated from unexfoliated graphite fluoride through centrifugation.

GF may be included at a concentration of 0.1 mg·mL$^{-1}$ to 30 mg·mL$^{-1}$ in the suspension including graphene fluoride.

Next, in the step of preparing the aramid nanofiber suspension, the suspension may be prepared by stirring and homogenizing a mixture of aramid nanofibers and a solvent. Here, the aramid nanofibers may be crosslinked by adding a crosslinking agent thereto. For example, based on the total weight of the aramid nanofiber suspension, 5 wt % of PNCT (phosphonitrilic chloride trimer) may be added to the aramid nanofibers to obtain PNCT-crosslinked aramid nanofibers (PANFs).

Next, in the coating step, the graphene fluoride suspension may be applied on the aramid nanofiber film made of the aramid nanofiber suspension. For example, this step may be performed through various methods such as ultrasonic spraying, air spraying, casting, and the like. Specifically, the aramid nanofiber suspension may be cast on a glass plate, and the GF suspension may be ultrasonically sprayed using an ultrasonic sprayer having a nozzle diameter of 0.7 mm at a frequency of 130 kHz and a power of 4.5 W.

Next, the aramid nanofiber suspension may be cast on the GF coating and then dried. Here, it is possible to obtain a sandwich-structured PANF/GF/PANF film (hereinafter referred to as 'AGA') through drying in ambient air for 10 to 14 hours.

The method of manufacturing the energy storage film according to the present invention enables the energy storage film to be simply manufactured at low cost, which improves mass-production capability.

A better understanding of the present invention may be obtained through the following examples.

However, the following examples are merely set forth to illustrate the present invention, and are not construed as limiting the present invention.

Example 1—Preparation of GF

The process for exfoliation of graphite fluoride (size: about 200-500 μm) was performed using a shear-induced fluidic reactor (also called a Taylor-Couette (T-C) reactor). The reactor is composed of concentric inner and outer cylinders having an annular size of 500 μm and an aspect ratio of P=L/d~20. Graphite fluoride dispersed in N-methyl-2-pyrrolidone (5 mg·mL$^{-1}$) was placed in the reactor, followed by exfoliation at 2000 rpm for 1 hour, which was found to generate an effective shear rate of 104 s$^{-1}$ or more and a stable TC flow. A homogeneous dispersion of mono- and/or few-layered graphene fluoride (hereinafter referred to as 'GF') sheets was separated from unexfoliated graphite fluoride through centrifugation. Centrifugation was carried out initially at 5000 g for 60 minutes and then at 420 g for 150 minutes.

Deionized water was added to the remaining exfoliated GF suspension (the liquid portion remaining after centrifugation of unexfoliated GF), so the suspension was disrupted, thus forming a precipitate. The precipitate was collected and freeze-dried for 24 hours to obtain a GF powder. The exfoliated dry yield was measured using an electronic scale HS224S (Hansung Instrument Co. Ltd., Korea).

Example 2—Preparation of Aramid Nanofiber (ANF) Suspension 1.5 g of KOH (purity: 85%, Alfa Aesar (USA)) was dissolved in 500 mL of a solvent mixture of DMSO (purity: 99.7%, Alfa Aesar (USA)) and water (25:1, v/v), after which 1 g of aramid fiber (TWARON OA-06, Teijin Aramid (Japan)) was added to the solution prepared as described above. The resulting mixture was subjected to magnetic stirring at 400 rpm at 30° C. for 4 hours, so ANF was dissolved to afford 2 mg·mL$^{-1}$ of a dark red solution. 100 mL of deionized distilled water was added to 100 mL of the ANF solution in a beaker with continuous stirring in order to initiate precipitation of the polymer chains. The mixture was then vigorously homogenized at 8000 rpm for 5 minutes to induce contact between precipitated macromolecules forming a colloidal suspension of ANF. Thereafter, the colloidal suspension was vacuum filtered, and the filtrate (exfoliated ANF) was washed with deionized distilled water to remove the DMSO solvent and residual KOH from the fiber surface. The resulting wet ANF was redispersed at a concentration of 0.5·mg·mL$^{-1}$ in distilled water with continuous mild stirring for use in subsequent steps.

Example 3—Preparation of Sandwich-Structured Film

An ANF solution (0.5 mg·mL$^{-1}$) including 5 wt % of hexachlorophosphazene (phosphonitrilic chloride trimer, PNCT) (Alfa Aesar (USA)), which is a crosslinking agent that imparts flame retardancy, was cast to a thickness of about 30 μm on a glass plate. Here, the ANF solution was applied on a release agent layer, followed by drying at 50° C. for 12 hours, thus obtaining an ANF film crosslinked with free-standing PNCT (hereinafter referred to as 'PANF'). The exfoliated GF suspension at a predetermined concentration (1-7 mg·mL$^{-1}$) was sprayed onto the 5×5 cm$^{-2}$ area of the prepared ANF film at 150° C. for 20 seconds using an ultrasonic sprayer (NS130K50, Sonaer Inc., USA) having a nozzle diameter of 0.7 mm at a frequency of 130 kHz and a power of 4.5 W. After the GF coating dried, the ANF suspension was cast onto the dried GF-coated ANF film on the glass plate, followed by drying in ambient air for 12 hours, thereby manufacturing a sandwich-structured PANF/GF/PANF film (hereinafter referred to as 'AGA').

Test Example 1—Confirmation of Morphology and Thermal Stability

Figure 1B:
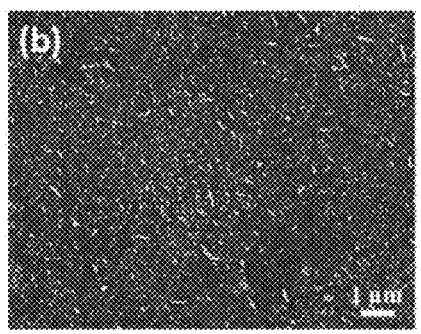
FIG. 1B shows an SEM image of the upper surface of a phosphonitrilic chloride trimer (PNCT)-crosslinked aramid nanofiber (PANF) film as a bottom layer.

Hereinafter, the AGA film is denoted by AGAx, in which x is the concentration of GF in the GF solution used in forming the sandwiched GF film (mid-layer). FIG. 1B shows an SEM image of the upper surface of the PANF film as a bottom layer. As shown in FIG. 1B, the PANF film, serving as the bottom layer, had a rough upper surface, and moreover, the fiber fragments were exposed outwards from the film surface.

Figure 1C:
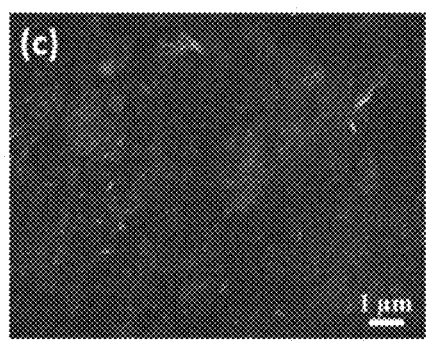
FIG. 1C shows an SEM image of the upper surface of the PANF film coated with a GF film as a mid-layer.

FIG. 1C shows an SEM image of the upper surface of the PANF film coated with the GF film as a mid-layer. With reference to FIG. 1C, the upper surface of the GF film, which is the mid-layer, appears very smooth.

Figure 1D:
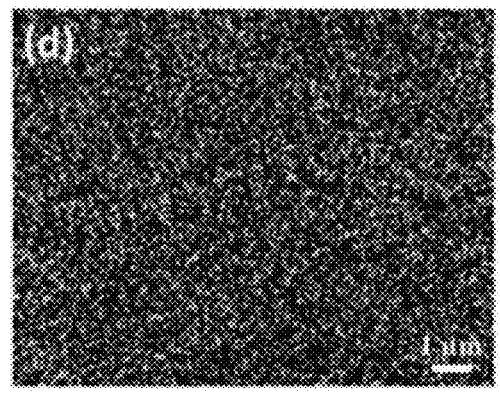
FIG. 1D shows an energy dispersive X-ray dispersive analysis (EDX) mapping image for the element F of the PANF film coated with the GF film.

FIG. 1D shows an EDX mapping image for the element F of the PANF film coated with the GF film according to FIG. 1C. As shown in FIG. 1D, the element F was uniformly distributed, indicating that the PANF surface was completely and uniformly covered by GF.

Figure 1E:
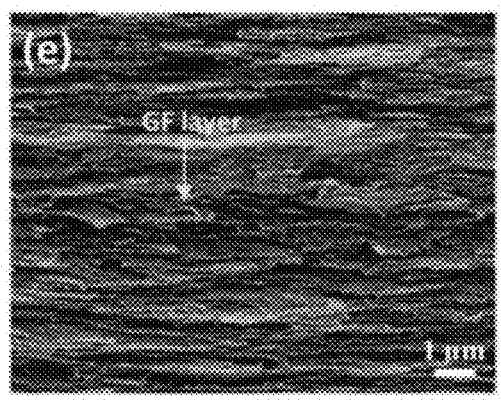
FIG. 1E shows an SEM image of the cross-section of an AGA5 film configured such that a GF layer is interposed between two ANF layers.

FIG. 1E shows an SEM image of the cross-section of an AGA5 film in which a GF layer is interposed between two ANF layers. With reference to FIG. 1E, the sandwich structure of the AGA5 film can be confirmed. Also, the total thickness of the AGA5 film is 11 μm. The use of a GF solution at a higher concentration results in a thicker sandwiched GF layer in the AGA film.

Figure 1F:
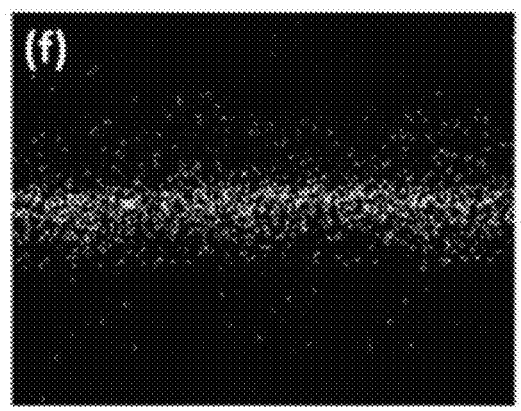
FIG. 1F shows an EDX mapping image for the element F of the cross-section of the AGA5 film.

FIG. 1F shows an EDX mapping image for the element F of the AGA5 film according to FIG. 1E. With reference to FIG. 1F, even distribution of the element F in the sandwiched layer of the film can be confirmed.

Figure 1G:
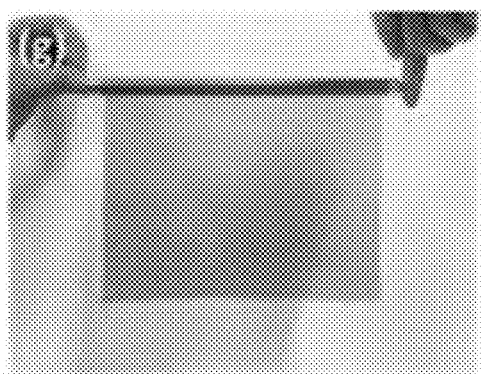
FIG. 1G shows a digital photograph of the AGA5 film wound in a roll form.

Also, FIG. 1G shows a digital photograph of the AGA5 film wound in the form of a roll. With reference to FIG. 1G, the flexibility of the AGA5 film is found to be very good.

Figure 2A:
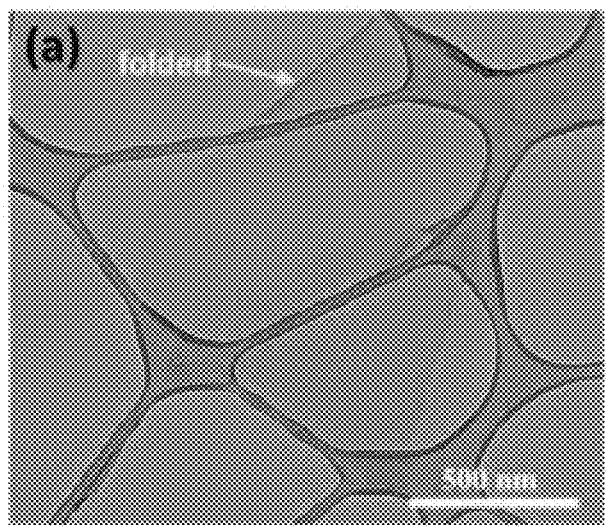
FIG. 2A shows a low-magnification TEM image of GF.
Figure 2B:
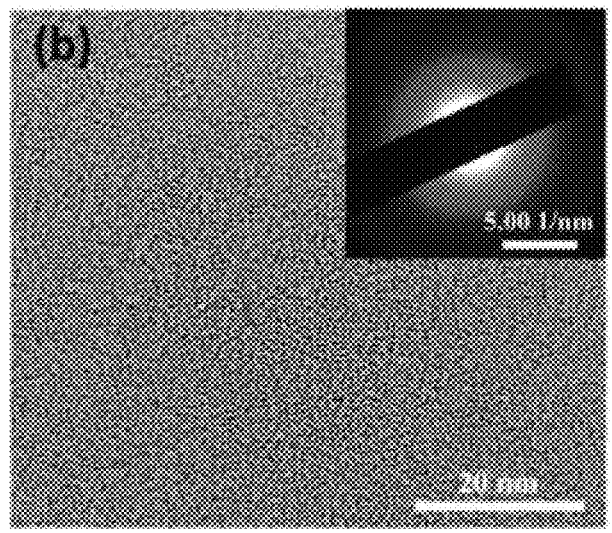
FIG. 2B shows a high-magnification TEM image of GF, the inset image of FIG. 2B being SAED (selected area electron diffraction) of the portion marked with a red box.

Taylor-Couette (TC) flow has proven to be an effective technique for exfoliation of a 2D material that produces a high-concentration solution at a high rate, and in the present invention, this technique was applied to exfoliate graphite fluoride, resulting in a yield of about 46%, which is higher than that of ball-milling or sonication techniques. The morphologies and properties of the resulting GF and ANF are shown in FIGS. 2A to 2F. FIG. 2A shows a low-magnification TEM image of GF, and FIG. 2B shows a high-magnification TEM image of GF, the inset image of FIG. 2B being SAED (selected area electron diffraction) of the portion marked with a red box. As shown in the low-magnification TEM image of FIG. 2A, a transparent 2D nanosheet morphology of GF having a lateral size greater than 1 μm can be observed, the yellow arrow representing a folded edge indicating the flexibility of GF. As shown in the high-magnification TEM image of FIG. 2B, a continuously disordered pattern of the basal plane of GF due to transition of the sp$^2$ (C=C) structure to sp$^3$ (C—F) by fluorine can be observed. With reference to the inset image of FIG. 2B, SAED having no crystal lattice can be confirmed, indicating that the GF is in an amorphous phase.

Figure 2C:
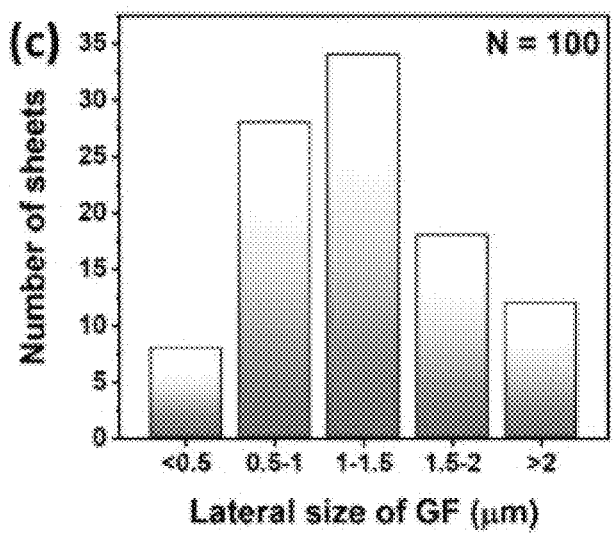
FIG. 2C shows the results of statistical analysis of 100 exfoliated GF sheets.

FIG. 2C shows the results of statistical analysis of 100 exfoliated GF sheets. With reference to FIG. 2C, it can be found that the major portion of GF had a lateral size in the range of 0.5-2 μm with a mean size of 1.3±0.4 μm.

Figure 2D:
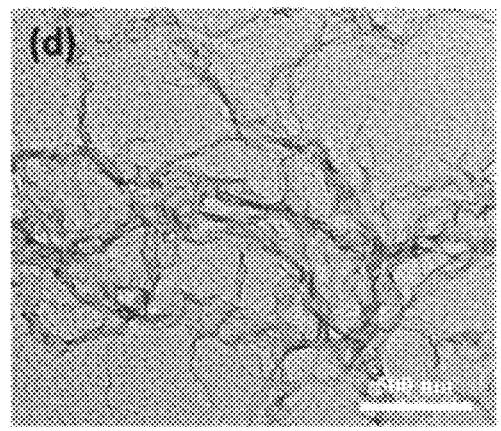
FIG. 2D shows a TEM image of ANF.

FIG. 2D shows a TEM image of ANF. With reference to FIG. 2D, it can be confirmed that ANF had a uniform appearance, with a maximum length of 10 μm and a diameter of 10 to 20 nm, and existed in an entangled form.

Figure 2E:
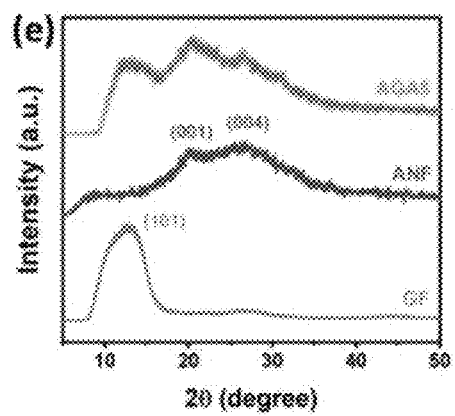
FIG. 2E shows an X-ray diffraction (XRD) pattern of each of GF, ANF, and AGA5 films.

FIG. 2E shows an X-ray diffraction (XRD) pattern of each of GF, ANF, and AGA5 films, indicating the crystal structure thereof. With reference to FIG. 2E, two typical peaks centered at 2θ=20.3° and 26.8°, corresponding to the (110) and (004) lattice planes of p-phenylene terephthalamide (PPTA) obtained through XRD of ANF, can be observed. The XRD pattern of the sandwiched AGA5 film shows all peak characteristics for both ANF and GF.

Figure 2F:
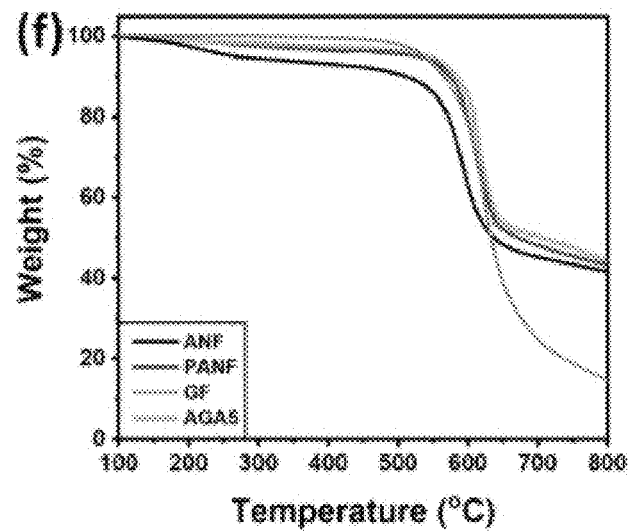
FIG. 2F shows the results of thermogravimetric analysis (TGA) of GF, ANF, PANF, and AGA5 films.

FIG. 2F shows the results of thermogravimetric analysis (TGA) of GF, ANF, PANF, and AGA5 films, indicating the thermal stability thereof. With reference to FIG. 2F, GF exhibited no mass loss (no thermal degradation) up to 400° C. and had superior thermal stability, with weight loss less than 5% in the temperature range of 400-550° C. Vigorous thermal degradation of GF started at about 650° C. and resulted in a mass loss of about 83% at 800° C. On the other hand, the ANF film started to degrade at a temperature of about 100° C. and reached a mass loss of 8 wt % at 500° C. This mass loss is due to the degradation of thermally unstable oxygen-containing groups (carboxyl, hydroxyl) on the ANF surface. In order to improve the thermal stability of ANF, 5 wt % of PNCT (phosphonitrilic chloride trimer) was added to the ANF film, thereby yielding PNCT-crosslinked ANF (PANF). The PANF film and the AGA5 film showed excellent thermal stability in which only 3 wt % of the mass was decomposed at 500° C., confirming that the dielectric film is functional up to 500° C.

Test Example 2—Confirmation of Dielectric Properties

Figure 3A:
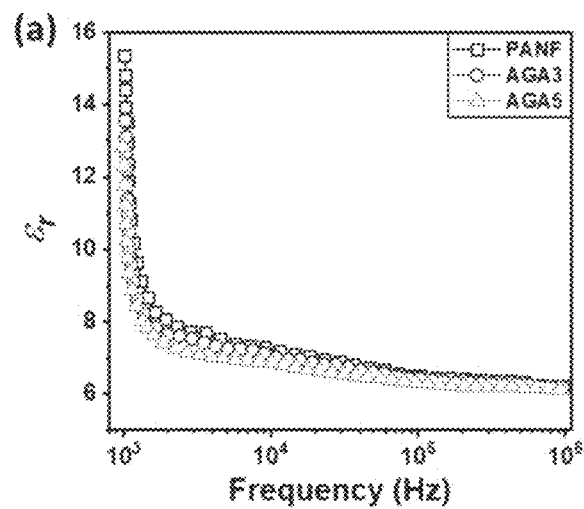
FIGS. 3A and 3B show the dielectric constant ($\varepsilon_r$) and the dielectric loss (tan δ) measured at a frequency in the range of $10^3$-$10^6$ Hz of PANF, AGA3, and AGA5 films.
Figure 3B:
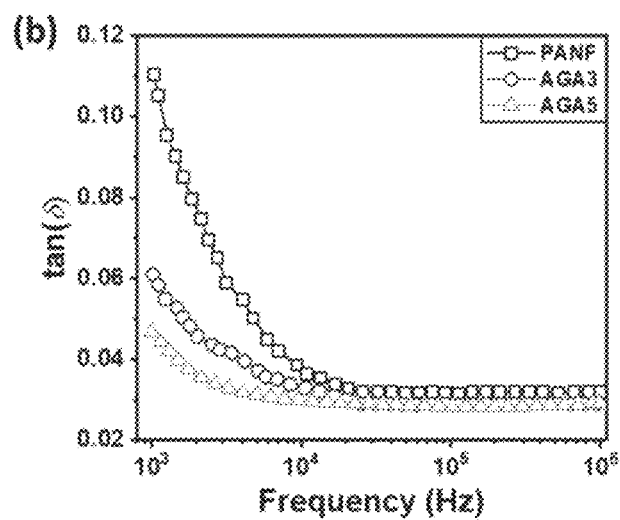

FIGS. 3A and 3B show the dielectric constant ($\varepsilon_r$) and the dielectric loss (tan δ) measured at a frequency in the range of $10^3$-$10^6$ Hz of PANF, AGA3, and AGA5 films. The $\varepsilon_r$ and tan δ of all AGAx films gradually decreased with an increase in the frequency. This is because the mobility of the polar groups contributes marginally to the dielectric constant when the frequency of the applied electric field exceeds the relaxation frequency. The $\varepsilon_r$ of the PANF film was approximately 15.3 at $10^3$ Hz, and then rapidly decreased to about 7.1 at 104 Hz and remained stable, greater than 6, at higher frequencies. The AGAx film showed the same trend as the PANF film, indicating that the inherent chain structure and dielectric properties of the PANF film were not greatly changed in the AGA film. Incorporation of GF nanosheets into the AGA film reduced the $\varepsilon_r$ value compared to the PANF film at the same frequency. For example, the $\varepsilon_r$ of the AGA5 film having a GF concentration of 5 mg·mL$^{-1}$, which is the concentration of interest, was 12.8 at $10^3$ Hz, which is about 16% lower than that of the pristine PANF film at the same frequency. This is deemed to be due to the relatively low dielectric constant of GF (i.e. ≈3).

Figure 3C:
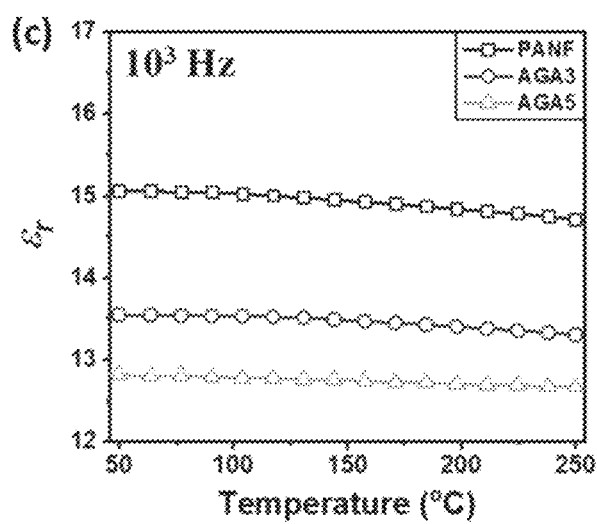
FIGS. 3C and 3D show the results of measurement of the dielectric constant and dielectric loss depending on the temperature at $10^3$ Hz.
Figure 3D:
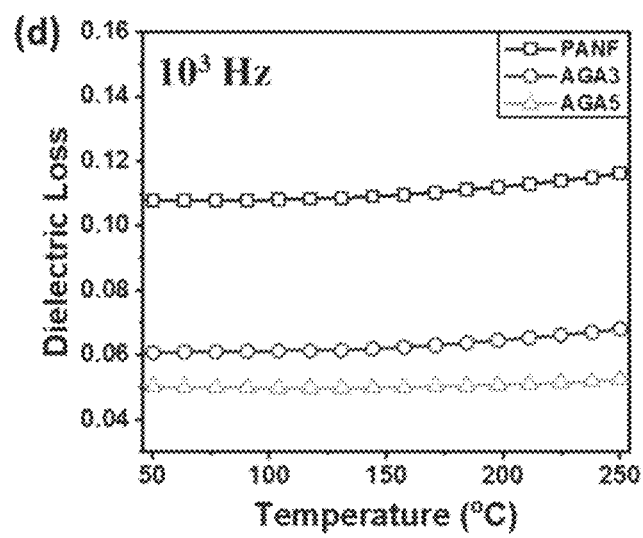

As shown in FIGS. 3B and 3D, the dielectric loss of the AGA film was lower than that of the PANF film, particularly at low frequencies. For example, at $10^3$ Hz, the dielectric loss was 0.11 in the PANF film and was 0.046 in AGA5. In particular, the dielectric loss of the AGA film was lower than those of ferroelectric polymers and nanocomposites. This indicates that the sandwiched GF layer is capable of effectively suppressing dielectric loss resulting from low electrical conductivity, which is advantageous in realizing the low leakage current and energy loss of the AGA film.

In order to evaluate the effect of temperature on the dielectric properties of the PANF and AGA films, the dielectric constant and the dielectric loss were measured at various temperatures (ranging from 30° C. to 250° C.) at a frequency of $10^3$ Hz. Consequently, with reference to FIGS. 3C and 3D, both the dielectric constant and the dielectric loss showed variation of less than 5% between 250° C. and room temperature, indicating that both the PANF and AGA films have very stable dielectric properties at high temperatures.

Test Example 3—Confirmation of Breakdown Strength Properties

Breakdown strength ($E_b$) is important for the high energy density of dielectric materials. This is because the discharged energy density of the material increases with an increase in the electric field intensity, and also because high breakdown strength allows application of the E<$E_b$ value. The breakdown strength of the AGA film was analyzed with the following Weibull distribution function.

$$P(E) = 1 - e^{-\left(\frac{E}{E_b}\right)^\beta} \quad \text{Equation (1)}$$

Figure 4A:
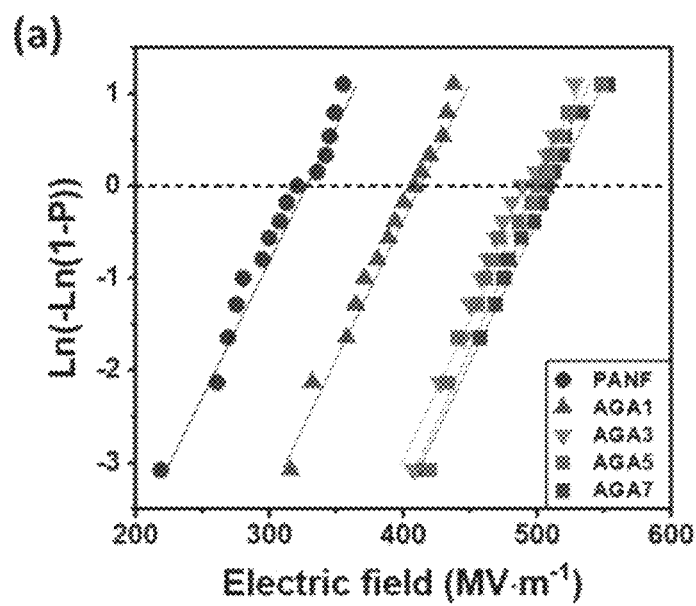
FIG. 4A shows Weibull plots of PANF and AGA films under various electric fields.
Figure 4B:
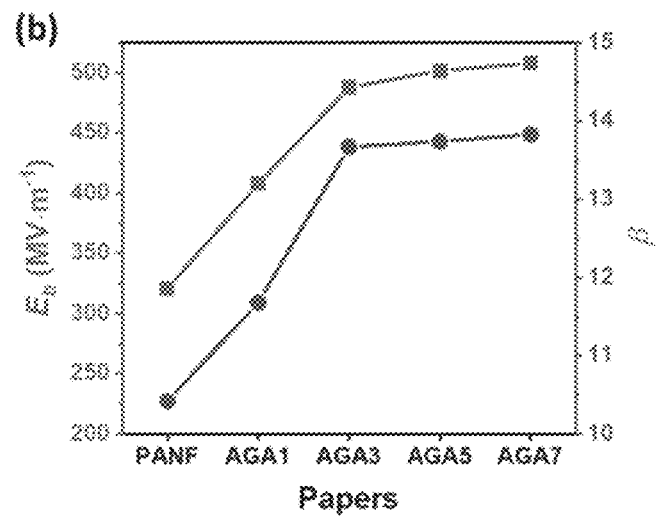
FIG. 4B shows the breakdown strength ($E_b$) (symbol: filled square) and the shape parameter (B) (symbol: filled circle) of PANF and AGA films extracted from Weibull plots.

Here, P(E) is the cumulative failure probability, E is an experimentally determined breakdown strength, $E_b$ is the characteristic for the material breakdown strength at the cumulative failure probability of 63.2%, and β (shape parameter) is a measure for reliability against failure. A high β value indicates high reliability and low scattering. The Weibull distribution as a function of the electric field and the fitted values of $E_b$ and β of the PANF and AGA films are shown in FIGS. 4A and 4B. It can be seen that the $E_b$ of all AGA films remarkably improved with an increase in GF content. $E_b$ of the PANF film was about 321 MV·m⁻¹, $E_b$ of the AGA3 film was gradually increased to 488 MV·m⁻¹, and $E_b$ of the AGA5 film was further increased to 502 MV·m⁻¹, showing an increase of more than 150% when compared with the PANF film. The AGA7 film exhibited a slightly higher $E_b$ value of about 507 MV·m⁻¹ than that of the AGA5 film. In order to ensure high breakdown strength and flexibility of the insulating film, the optimal concentration of the GF solution for manufacturing the insulating film was determined to be 5 mg·mL⁻¹. The reason that the PANF film shows low breakdown strength is due to the uncompressed structure thereof, the arrangement structure of 1D ANF may contain air gaps, and the breakdown strength of the PANF film is reduced due to the low breakdown strength of air (3 MV·m⁻¹).

Meanwhile, the great improvement in the breakdown strength of the AGA film is because GF has superior breakdown strength of 1000 MV·m⁻¹ and also because the sandwiched GF layer in the AGA film may serve as an insulating barrier effectively resisting current conduction through the ANF matrix. Also, variation in the shape parameter shows a trend very similar to the breakdown strength. Specifically, the AGA5 film exhibits a maximum R value of 13.7, which is increased by about 30% compared to the PANF film, indicating excellent dielectric reliability of the AGA5 film.

Figure 4C:
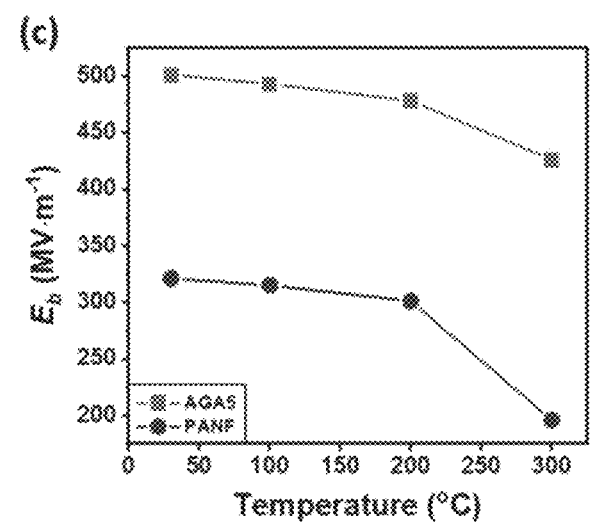
FIG. 4C shows the breakdown strength ($E_b$) of the AGA5 film and PANF at various temperatures.

With reference to FIG. 4C, the AGA5 film shows excellent stability with respect to temperature. The $E_b$ of the AGA5 film decreased by about 17%, changing from 502 MV·m⁻¹ to 426 MV·m⁻¹ when the temperature was elevated from 30° C. to 300° C. The $E_b$ of the PANF film decreased by about 37% when the temperature was elevated from 30° C. to 300° C., and was found to be 196 MV·m⁻¹. The high $E_b$ stability of the AGA film is attributed to the excellent thermal stability of PANF and GF.

Figure 4D:
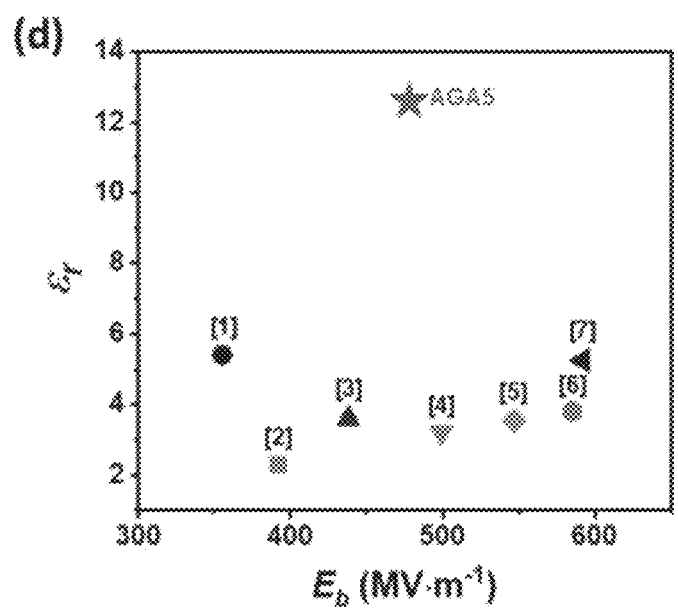
FIG. 4D shows $E_b$ and $\varepsilon_r$ of a capacitive polymer composite (random CPC) composed of a randomly dispersed filler and a capacitive polymer composite (sandwiched CPC) composed of a sandwiched filler at various temperatures.

FIG. 4D shows $E_b$ and $\varepsilon_r$ of a capacitive polymer composite (random CPC) composed of a randomly dispersed filler, a capacitive polymer composite (sandwiched CPC) composed of a sandwiched filler, and AGA5 at various temperatures. Specifically, the materials for [1] to [7] in FIG. 4D are shown in Table 1 below.

TABLE 1

| No. | Type | Specified structure |
|---|---|---|
| [1] | $Al_2O_3$@$ZrO_2$/PEI | Composite configured such that filler in which $ZrO_2$ core particles are covered with $Al_2O_3$ shell material is randomly dispersed in polyethyleneimine (PEI) |
| [2] | $Al_2O_3$-NPLs/c-BCB | Composite configured such that filler including $Al_2O_3$ and nanoplates (NPLs) is randomly dispersed in crosslinked divinyltetramethyldisiloxane-bis(benzocyclobutene) (c-BCB) |
| [3] | Multi-layered $Al_2O_3$/PI | Multilayered $Al_2O_3$ thin film/polyimide film structure |
| [4] | BNNS/c-BCB | Composite configured such that hexagonal boron nitride nanosheets (BNNS) are randomly dispersed in crosslinked divinyltetramethyldisiloxane-bis(benzocyclobutene) (c-BCB) |
| [5] | THV/VH-3L | Three-layered composite film composed of poly(vinylidene fluoride-hexafluoropropylene) film/poly(tetrafluoroethylene-hexafluoropropylene-vinylidene fluoride) film/poly(vinylidene fluoride-hexafluoropropylene) film |
| [6] | $TiO_2$-PEI/BNNS-PEI | Composite film configured to include a layer in which $TiO_2$ is randomly dispersed as filler in polyethyleneimine (PEI) and a layer in which hexagonal boron nitride nanosheets (BNNS) are randomly dispersed as filler in polyethyleneimine (PEI) |
| [7] | BNNS/PC/BNNS | Sandwiched composite having a structure of hexagonal boron nitride nanosheet (BNNS) coating/polycarbonate (PC)/hexagonal boron nitride nanosheet (BNNS) coating |

With reference to FIG. 4D, at 200° C., AGA5 exhibited $\varepsilon_r$ of 12.7 and $E_b$ of 478 MV·m⁻¹, and thus was superior compared to the BNNS/c-BCB composite [5] having $\varepsilon_r$ of 3.1 and $E_b$ of about 410 MV·m⁻¹, among examples of random CPC, and also was vastly superior compared to the $Al_2O_3$/PI composite [3] having $\varepsilon_r$ of 3.6 and $E_b$ of 438 MV·m⁻¹, among examples of sandwiched CPC.

Test Example 4—Confirmation of Dielectric Displacement and Energy Storage Properties The dielectric displacement-electric field (D-E) loops of the PANF film and the AGA film were measured through ferroelectric workstation under various electric fields at various temperatures, and the discharged energy density ($U_d$), stored energy density ($U_s$), and energy storage efficiency (η) were calculated from the D-E hysteresis curve obtained in the charge/discharge cycle of the AGA film using the following Equations (2) to (4).

The discharged energy density ($U_d$) was calculated using Equation (2) below.

$$U_d = \int_{D_r}^{D_m} E dD \qquad \text{Equation (2)}$$

Here, $D_m$ is the maximum achievable electric displacement generated in the AGA film at a given charge cycle in the range (0-$E_m$). $E_m$ is the maximum applicable field strength. $E_m$ may be accepted equal to 0.8 $E_b$ (maintaining 20% of the dielectric strength) and $D_r$ is the charge density remaining in the film after completion of the discharge cycle.

The stored energy density ($U_s$) was calculated using Equation (3) below.

$$U_s = \int_0^{D_m} E dD \qquad \text{Equation (3)}$$

The charge/discharge efficiency (ρ) was calculated using Equation (4) below.

$$\eta = \frac{U_d}{U_s}$$ Equation (4)

($D_m$–$D_r$) represents the effective electric displacement, and reflects the high-field polarizable capability of the material. With an increase in the maximum achievable electric displacement ($D_m$) and a decrease in the remaining electric displacement ($D_r$), higher effective electric displacement ($D_m$–$D_r$) can be achieved. A high value of ($D_m$–$D_r$) is necessary to obtain the maximum discharged energy density ($U_d$) and energy storage efficiency (η).

Figure 5A:
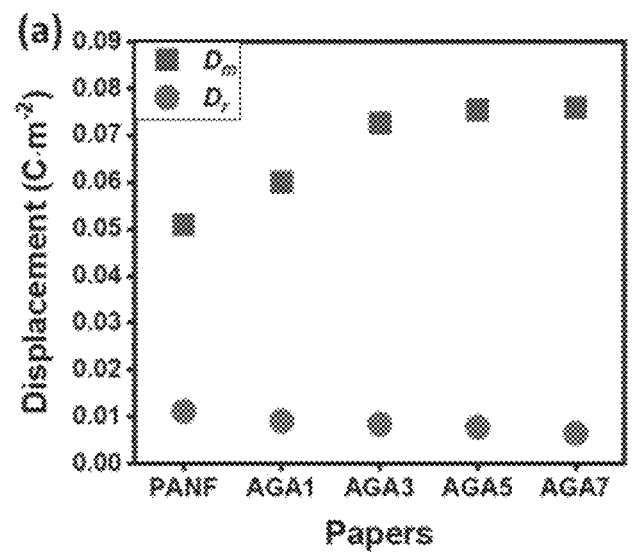
FIG. 5A shows the results of comparison of maximum achievable electric displacement ($D_m$) and remaining electric displacement ($D_r$) of PANF and AGAx films at $E_b$.

This displacement at the maximum applicable field strength $E_b$ of the AGA film was extracted from the dielectric displacement-electric field (D-E) loops, and is shown in FIG. 5A. $D_m$ of the PANF film was only 0.051 C·m$^{-2}$, $D_m$ of the AGA3 was greatly increased to 0.073 C·m$^{-2}$, and ultimately, $D_m$ of the AGA5 film was increased to 0.076 C·m$^{-2}$, which is an increase of 49% compared to the PANF film. $D_m$ may be improved due to the higher $E_b$ of the AGA film having a thicker GF layer. Moreover, the presence of ANF-GF and GF-ANF, which are mesoscopic interfaces in the AGA sandwich structure, is capable of generating strong interfacial polarization. More importantly, a thicker GF layer gives larger ($D_m$–$D_r$) values in the sandwiched film. For example, AGA5 exhibited 0.068 C·m$^{-2}$, which is 70% higher than that of the AGA1 film (0.051 C·m$^{-2}$), indicating high energy density performance and easy depolarization upon removal of the applied electric field.

Figure 5B:
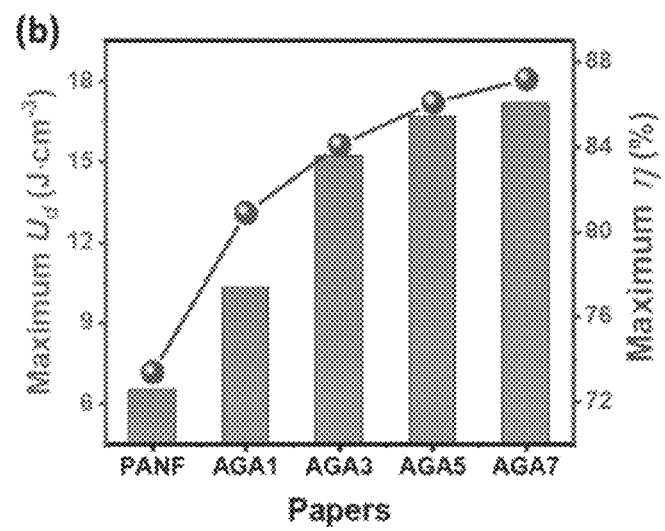
FIG. 5B shows maximum discharged energy density ($U_d$) and energy storage efficiency (η) of PANF and AGAx films at $E_b$.

FIG. 5B shows the results of calculation of maximum $U_d$ and η for various AGA films at room temperature. The maximum $U_d$ of the AGA film significantly increased with an increase in the thickness of the sandwiched GF layer, and the maximum $U_d$ of the AGA5 film reached 16.7 J·cm$^{-3}$, which is an increase of about 156% compared to the PANF film, and is also 10 times higher than that of the commercially available dielectric biaxially oriented polypropylene (BOPP) polymer. The improvement in the maximum $U_d$ of the AGA film with an increase in the thickness of the sandwiched GF layer is mainly due to the high $D_m$ and enhanced $E_b$. $U_d$ is approximately proportional to the square of the electric field. With the improvement in the maximum $U_d$, the maximum η is also effectively enhanced with an increase in the thickness of the sandwiched GF layer in the AGA film. In particular, the AGA5 film showed a higher η value of 86% than the PANF film (73.4%). The improved η may be attributed to the low $D_r$ for the minimum energy loss, which decreases from 0.011 C·m$^{-2}$, which is the $D_r$ of the PANF film, to 0.008 C·m$^{-2}$, which is the $D_r$ of the AGA5 film. $D_r$ is related to the mutual contribution of ferroelectric loss and conductive loss, and the thick GF layer may minimize conductive loss in the presence of a strong electric field, which leads to the suppressed $D_r$ and improved η. More importantly, the undischarged energy is converted into Ohm heat, resulting in deterioration of the discharge behavior and increased conductive loss and ferroelectric loss at high temperatures. In the presence of the thick GF layer, the intrinsic thermal conductivity of ANF and GF is high, so heat generated in the film may be effectively dissipated, thereby improving efficiency.

Figure 5C:
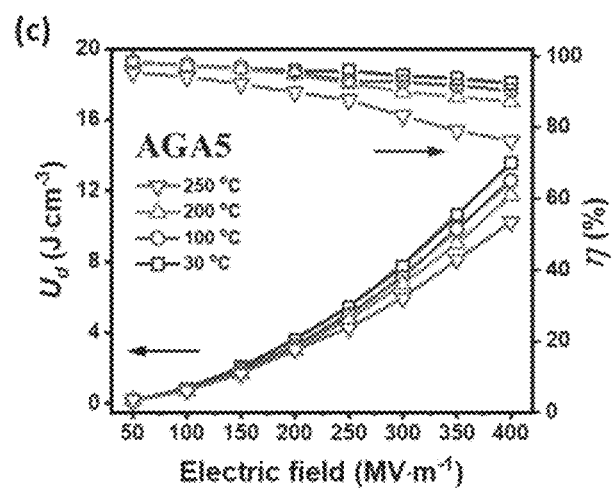
FIG. 5C shows $U_d$ and η of the AGA5 film under various electric fields at various temperatures.

In addition to the capacitive energy storage properties of dielectric capacitors, the stability of the energy storage density of a capacitor and the efficiency thereof upon application of a strong electric field at high temperatures are very important factors for practical application. FIG. 5C shows the electric-field dependence of $U_d$ and η at various temperatures (ranging from 30° C. to 250° C.) calculated from the D-E heterolysis loops. Overall, both $U_d$ and η of the AGA5 film under the applied electric field tended to decrease with an increase in the temperature. For a temperature change from 30° C. to 250° C. in an electric field of 400 MV·m$^{-1}$, $U_d$ decreased from 13.6 J·cm$^{-3}$ to 10.2 J·cm$^{-3}$, and η decreased from 92% to 76%.

Figure 5D:
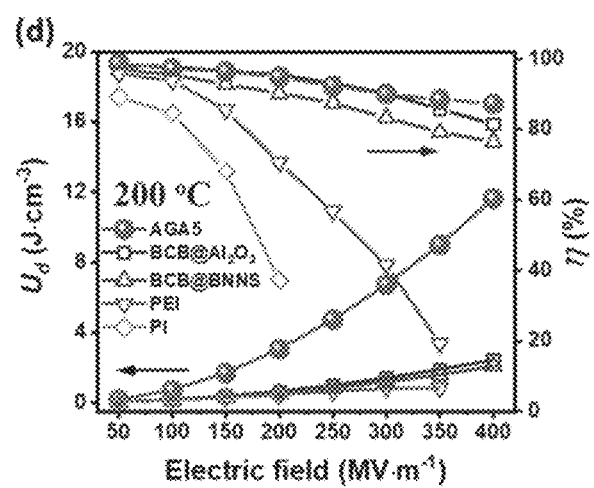
FIG. 5D shows a graph comparing $U_d$ and η for the AGA5 film, polymers (PEI and PI) having high glass transition temperature ($T_g$), and polymer nanocomposite capacitors ($Al_2O_3$/c-BCB and BNNS/c-BCB) under various electric fields at 200° C.

FIG. 5D shows a graph comparing $U_d$ and η for the AGA5 film, high-$T_g$ polymers (PEI and PI), and polymer nanocomposite capacitors ($Al_2O_3$/c-BCB and BNNS/c-BCB) under various electric fields at 200° C. As shown in FIG. 5D, the high-temperature capacitive energy storage properties of the AGA5 film are found to be vastly superior to those of dielectric polymers having high $T_g$ and polymer nanocomposite capacitors. For example, at E=200 M·Vm$^{-1}$, AGA5 has a storage density of 3.1 J·cm$^{-3}$ and an η value of 94.8, which are respectively 8 times and 2.5 times higher than those of PEI. Meanwhile, the efficiency of commercially available BOPP capacitors in electric vehicles decreases to approximately 70% under an electric field of 400 M·Vm$^{-1}$ at a temperature of 140° C. This indicates that the AGA5 film of the present invention can replace the commercially available BOPP capacitive film and also that the complex heat sink system for power inverters can be eliminated. Moreover, randomly dispersed BNNS and $Al_2O_3$ nanoplate-based BCB composites are two commercially available polymer nanocomposites for high-temperature (200° C.) capacitive energy storage. With reference to FIG. 5D, it can be found that the high-temperature capacitive energy storage properties of the AGA5 film of the present invention are vastly superior to those of these nanocomposites. In particular, the AGA5 film is able to liberate $U_d$ of 11.6 J·cm$^{-3}$ at 200° C. under an electric field of 400 M·Vm$^{-1}$, which is about 5 times as high as BNNS/c-BCB (2.1 J·cm$^{-3}$) or $Al_2O_3$/c-BCB (2.4 J·cm$^{-3}$). Furthermore, it was confirmed that the AGA5 film exhibited η of 88% even at 200° C. under an electric field of 400 M·Vm$^{-1}$, which is higher than those of the $Al_2O_3$/c-BCB (81%) and BNNS/c-BCB (78%) nanocomposites.

Figure 6A:
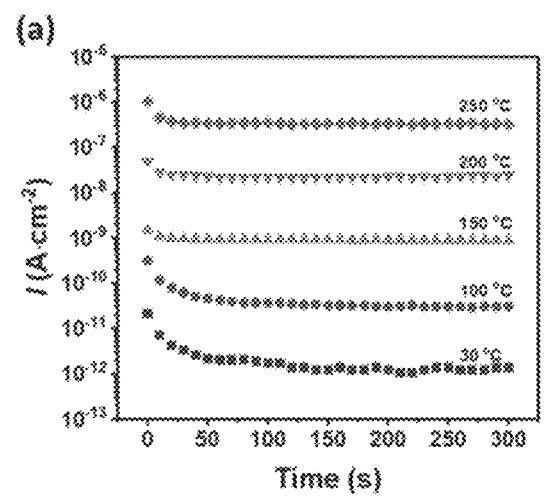
FIG. 6A shows the leakage current density of the AGA5 film under an electric field of 200 MV·m$^{-1}$ at various temperatures.
Figure 6B:
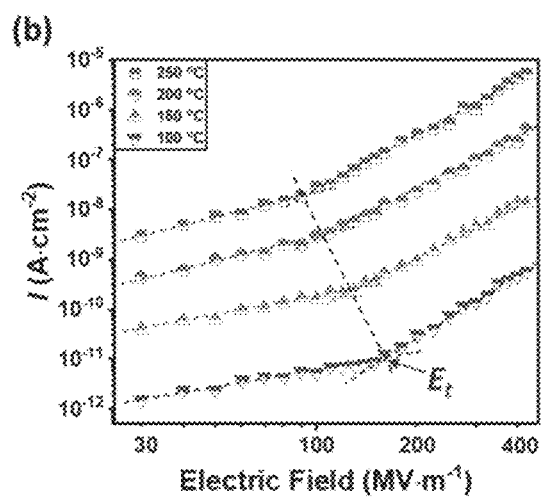
FIG. 6B shows the leakage current density of the AGA5 film depending on changes in the electric field at high temperatures.

Test Example 5—Confirmation of Leakage Current Density and Activation Energy Properties It has been demonstrated that the loss mechanism of dielectric capacitive materials operating under strong electric fields at high temperatures is mainly dependent on electrical conduction. FIG. 6A shows the leakage current density of the AGA5 film depending on the measurement time at various temperatures under an electric field of 200 MV·m$^{-1}$, and FIG. 6B shows the leakage current density of the AGA5 film depending on the intensity of electric field at various temperatures. Although not shown in the drawings, the PANF film exhibited rapidly increased leakage current density with increased temperatures under a strong electric field. Specifically, the leakage current density of the PANF film at 200 MV·m$^{-1}$ was increased from 9.43×10$^{-11}$ to 9.07×10$^{-6}$ A/cm$^{-2}$ when the temperature was elevated from 30° C. to 250° C. Meanwhile, introduction of the GF layer efficiently interfered with electrical conduction, so I of the AGA5 film was greatly reduced under a strong electric field at high temperatures. With reference to FIG. 6A, when the temperature was elevated from 30° C. to 250° C., the leakage current density of the AGA5 film at 200 MV·m$^{-1}$ was increased from 1.38×10$^{-12}$ to 3.24×10$^{-7}$ A/cm$^{-2}$.

With reference to FIG. 6B, when the electric field of the AGA5 film was increased from 50 to 200 MV·m$^{-1}$ at 100° C., I thereof was increased from 2.34×10$^{-12}$ to 3.03×10$^{-11}$ A/cm$^{-2}$, and increased about 1000 times to 3.30×10$^{-7}$ A/cm$^{-2}$ at 250° C. The high electrical resistivity of the AGA5 film effectively reduced the dielectric loss under a strong electric field at high temperatures, resulting in improved η in the AGA5 film and excellent capacitive performance of the AGA5 film.

It is known that the threshold electric field ($E_t$), in which the slope of I shows a deviation from the applied electric field, is correlated to the activation energy ($E_a$) of the conduction mechanism.

Figure 6C:
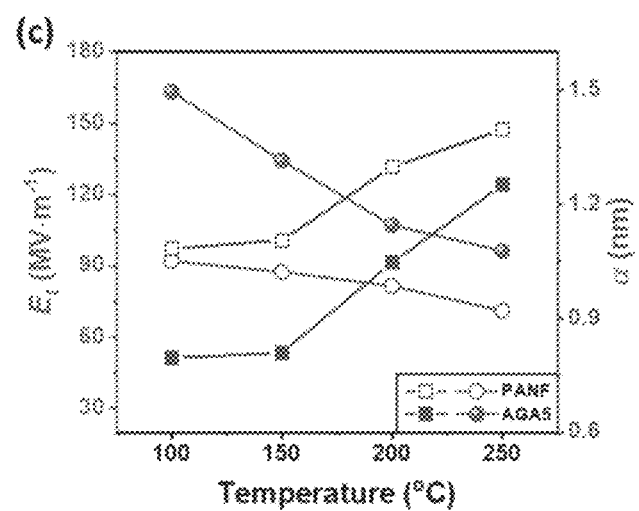
FIG. 6C shows the threshold electric field ($E_t$) and the hopping distance (α) of PANF and AGA5 depending on the temperature.

FIG. 6C shows the threshold electric field ($E_t$) and the hopping distance (α) of the PANF and AGA5 films depending on the temperature. With reference to FIG. 6C, it appears that $E_t$ of the AGA5 film is higher than $E_t$ of the PANF film in the temperature range of 100° C. to 250° C. Also, both showed a gradual decrease with an increase in temperature. For example, the $E_t$ of the AGA5 film was as high as 163.2 MV·m$^{-1}$ at 100° C., which is about 77% higher than that of the PANF film. In addition, the $E_t$ of the AGA5 film decreased to 96.3 MV·m$^{-1}$ at 250° C., which was a 36% improvement compared to the PANF film at the same application temperature. This indicates that the PANF film has low activation energy ($E_a$) compared to the AGA5 film at a high temperature.

With reference to FIG. 6C, the hopping distance (α) of the AGA5 film is always shorter than that of the PANF film in the temperature range of 100° C. to 250° C. Specifically, when the temperature was elevated from 100° C. to 250° C., the hopping distance (α) of the PANF film increased from 1.0825 nm to 1.3951 nm while that of the AGA5 film increased from 0.7953 nm to 1.2502 nm.

Figure 6D:
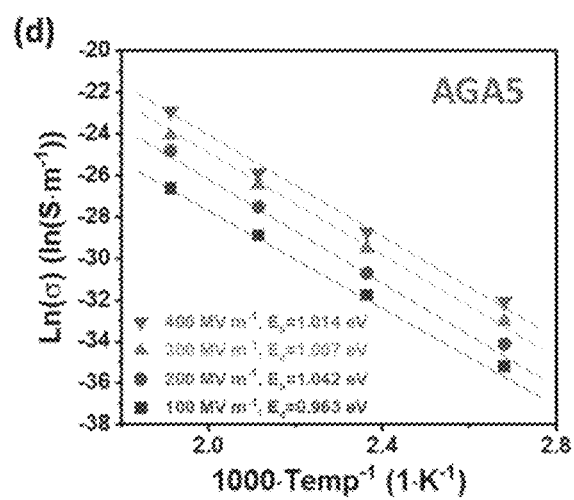
FIG. 6D shows the activation energy ($E_a$) of the AGA5 film calculated from the Arrhenius relationship as a function of the electric field.
Figure 6E:
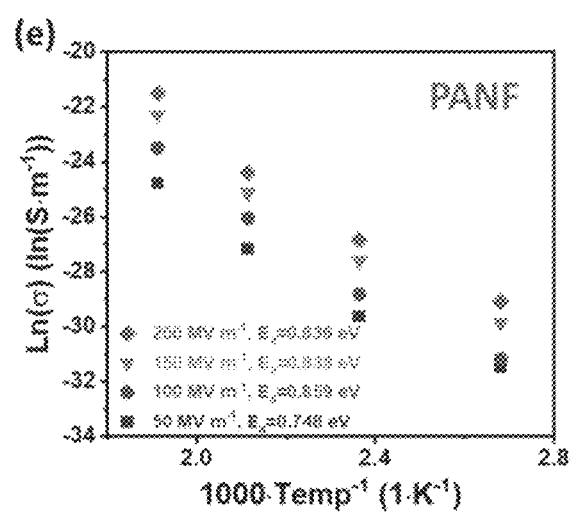
FIG. 6E shows the activation energy ($E_a$) of PANF.

FIGS. 6D and 6E show the activation energy ($E_a$) of the AGA5 and PANF films calculated from the Arrhenius relationship as a function of the electric field. $E_a$ may be determined by the Arrhenius relationship. With reference to FIGS. 6D and 6E, $E_a$ of the AGA5 film was found to be higher than that of the PANF film. Specifically, under an electric field of 200 MV·m$^{-1}$, the $E_a$ of the AGA5 film was about 1.042 eV, whereas the $E_a$ of the PANF was 0.836 eV. A shorter hopping distance (α) and greater activation energy ($E_a$) may lead to a deeper average trap depth for charge carriers, thereby reducing I and dielectric loss, resulting in a significant improvement in $U_d$ and η in the AGA5 film.

As is apparent from the above description, an energy storage film according to various embodiments of the present invention has a sandwich structure, and thus has excellent high-temperature capacitive energy storage properties. Specifically, the energy storage film of the present invention is capable of effectively reducing leakage current density, thus realizing large displacement, high energy density, and charge/discharge efficiency, and maintaining superior breakdown strength even at high temperatures.

The energy storage film of the present invention has excellent flexibility and is thus applicable to a flexible electronic device.

The energy storage film of the present invention is applicable to various fields requiring the ability to withstand severe operating temperatures, such as those of wearable electronic devices, next-generation microelectronics, electric vehicles, and aerospace systems.

The features, structures, effects, and the like described in the embodiments are included in at least one embodiment of the present invention, but are not necessarily limited to one embodiment. Moreover, the features, structures, effects, and the like illustrated in each embodiment may be combined or modified for other embodiments by those of ordinary skill in the art to which the embodiments belong. Accordingly, content related to such combinations and modifications should be interpreted as being included in the scope of the present invention.

In addition, although the embodiments have been described above, these are merely exemplary and do not limit the present invention, and those of ordinary skill in the art to which the present invention belongs will appreciate that various modifications and applications not exemplified above are possible without departing from the essential characteristics of the present embodiment. For example, each component specifically shown in the embodiments may be implemented in a modified form. Also, differences related to these modifications and applications should be construed as being included in the scope of the present invention defined in the appended claims.

What is claimed is:

1. An energy storage film, comprising:
   a first layer and a second layer comprising aramid nanofibers (ANFs); and
   a mid-first layer comprising graphene fluoride (GF) disposed between the first layer and the second layer,
   wherein the energy storage film is a free-standing structure, and
   wherein the aramid nanofibers are cross-linked with a crosslinking agent.

2. The energy storage film of claim 1, wherein the graphene fluoride is exfoliated from graphite fluoride, and has a lateral size of 0.1 μm to 10 μm.

3. The energy storage film of claim 1, wherein the mid-first layer is formed from a GF suspension comprising graphene fluoride at a concentration of 0.1 mg·mL$^{-1}$ to 30 mg·mL$^{-1}$.

4. The energy storage film of claim 1, wherein a diameter of the aramid nanofibers is 5 to 50 nm.

5. The energy storage film of claim 1, further comprising:
   a third layer comprising aramid nanofibers; and
   a mid-second layer comprising graphene fluoride disposed between the second layer and the third layer.

6. A method of manufacturing an energy storage film, comprising:
   preparing a graphene fluoride suspension comprising graphene fluoride;
   preparing an aramid nanofiber suspension;
   applying the graphene fluoride suspension as a second layer on an aramid nanofiber film made of the aramid nanofiber suspension, wherein the aramid nanofiber film is a first layer; and
   casting the aramid nanofiber suspension as a third layer on the graphene fluoride and performing drying of the energy storage film, which is a free-standing energy storage film,
   wherein the aramid nanofiber suspension comprises aramid nanofibers crosslinked with a crosslinking agent.

7. The method of claim 6, wherein the graphene fluoride is exfoliated from graphite fluoride.

8. The method of claim 7, wherein exfoliation of the graphite fluoride is performed using at least one of a shear-induced fluidic reactor, tip sonication, or ball milling.

9. The method of claim 6, wherein the graphene fluoride suspension comprises graphene fluoride at a concentration of 0.1 mg·mL$^{-1}$ to 30 mg·mL$^{-1}$.

* * * * *